(12) United States Patent
Wang

(10) Patent No.: US 8,301,210 B2
(45) Date of Patent: Oct. 30, 2012

(54) COMMUNICATION DEVICE

(75) Inventor: John C. Wang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 988 days.

(21) Appl. No.: 12/121,992

(22) Filed: May 16, 2008

(65) Prior Publication Data

US 2008/0293459 A1   Nov. 27, 2008

(30) Foreign Application Priority Data

May 22, 2007   (TW) ................................ 96118200 A

(51) Int. Cl.
*H04B 1/38* (2006.01)
(52) U.S. Cl. .................................... 455/575.3; 455/90.3
(58) Field of Classification Search ............... 455/550.1, 455/556.1, 566, 575.1, 575.3, 575.4, 90.1, 455/90.3
See application file for complete search history.

(56) References Cited

U.S. PATENT DOCUMENTS

| | | | | |
|---|---|---|---|---|
| 6,047,196 A | * | 4/2000 | Makela et al. | 455/556.1 |
| 6,141,540 A | * | 10/2000 | Richards et al. | 455/575.3 |
| 2002/0072395 A1 | * | 6/2002 | Miramontes | 455/566 |
| 2005/0159194 A1 | * | 7/2005 | Heintz et al. | 455/575.3 |
| 2007/0060217 A1 | | 3/2007 | Kim | |

FOREIGN PATENT DOCUMENTS

CN   1925511   3/2007

OTHER PUBLICATIONS

English language translation of abstract of CN 1925511 (published Mar. 7, 2007).

* cited by examiner

*Primary Examiner* — Thanh Le
(74) *Attorney, Agent, or Firm* — Thomas|Kayden

(57) ABSTRACT

A communication device includes a first casing, a second casing, a hinge, a keyboard and an antenna. The hinge is connected to the first casing and the second casing, so that the first casing is capable of rotating with respect to the second casing. The keyboard for inputting data is disposed at the second casing. The keyboard can be a QWERTY keyboard, a AZERTY keyboard, a QWERTZ keyboard or a DVORAK keyboard. The antenna for sending or receiving a communication signal is disposed in the first casing or the second casing.

20 Claims, 3 Drawing Sheets

COMMUNICATION DEVICE

This application claims the benefit of Taiwan application Serial No. 96118200, filed May 22, 2007, the subject matter of which is incorporated herein by reference.

BACKGROUND OF THE INVENTION

1. Field of the Invention

The invention relates in general to a communication device, and more particularly to a communication device having two operating modes.

2. Description of the Related Art

Many multi-functional communication devices have been highly developed as a result of the development of the communication technology. In order to input letters, numbers or punctuation marks quickly, the communication device is usually provided with a keyboard, such as a QWERTY keyboard, to increase the efficiency of editing documents.

Referring to FIG. 1, a conventional communication device is illustrated. The communication device 700 includes a keyboard 710 and a display 720. As above-mentioned, the keyboard 710 is used for inputting letters, numbers or punctuation marks. The display 720 is used for displaying an image.

However, as shown in FIG. 1, the display 720 and the keyboard 710 of the communication device 700 are both disposed at the same casing 730, so that the size of the communication device 700 is determined by the size of the keyboard 710 and the size of the display 720. As a result, the size of the communication device 700 is so large that it is inconvenient to carry.

SUMMARY OF THE INVENTION

The invention is directed to a communication device having two casings capable of folding onto each other and making the disposition design of a keyboard on surfaces of the casing is more flexible under the presupposition of a decrease in the size of the communication device. In addition, the foldable design of the communication device provides the automatic switch between two operating modes.

According to a first aspect of the present invention, a communication device comprising a first casing, a second casing, a hinge, a keyboard and an antenna is provided. The hinge is connected to the first casing and the second casing, so that the first casing is capable of rotating with respect to the second casing. The keyboard for inputting data is disposed at the second casing. The keyboard is one of a QWERTY keyboard, an AZERTY keyboard, a QWERTZ keyboard and a DVORAK keyboard. The antenna for sending or receiving a communication signal is disposed in the first casing or the second casing.

According to a second aspect of the present invention, a communication device comprising a first casing, a second casing and a two-stop hinge is provided. The two-stop hinge is connected to the first casing and the second casing, so that the first casing is capable of rotating with respect to the second casing. The two-stop hinge is capable of switching the communication device to operate in one of a first operating mode and a second operating mode. A first angle is formed between the first casing and the second casing when the communication device is switched to operate in the first operating mode. A second angle is formed between the first casing and the second casing when the communication device is switched to operate in the second operating mode.

According to a third aspect of the present invention, a communication device comprising a first casing, a second casing, a hinge, a keyboard and a display is provided. The hinge is connected to the first casing and the second casing, so that the first casing is capable of rotating with respect to the second casing. The keyboard for inputting data is disposed at the second casing. The keyboard is one of a QWERTY keyboard, an AZERTY keyboard, a QWERTZ keyboard and a DVORAK keyboard. The keyboard has a plurality of long-shaped keys. A long-axis direction of the long-shaped keys is not parallel to the hinge. The display for displaying an image is disposed at the first casing.

The invention will become apparent from the following detailed description of the preferred but non-limiting embodiments. The following description is made with reference to the accompanying drawings.

DETAILED DESCRIPTION OF THE INVENTION

Figure 2:
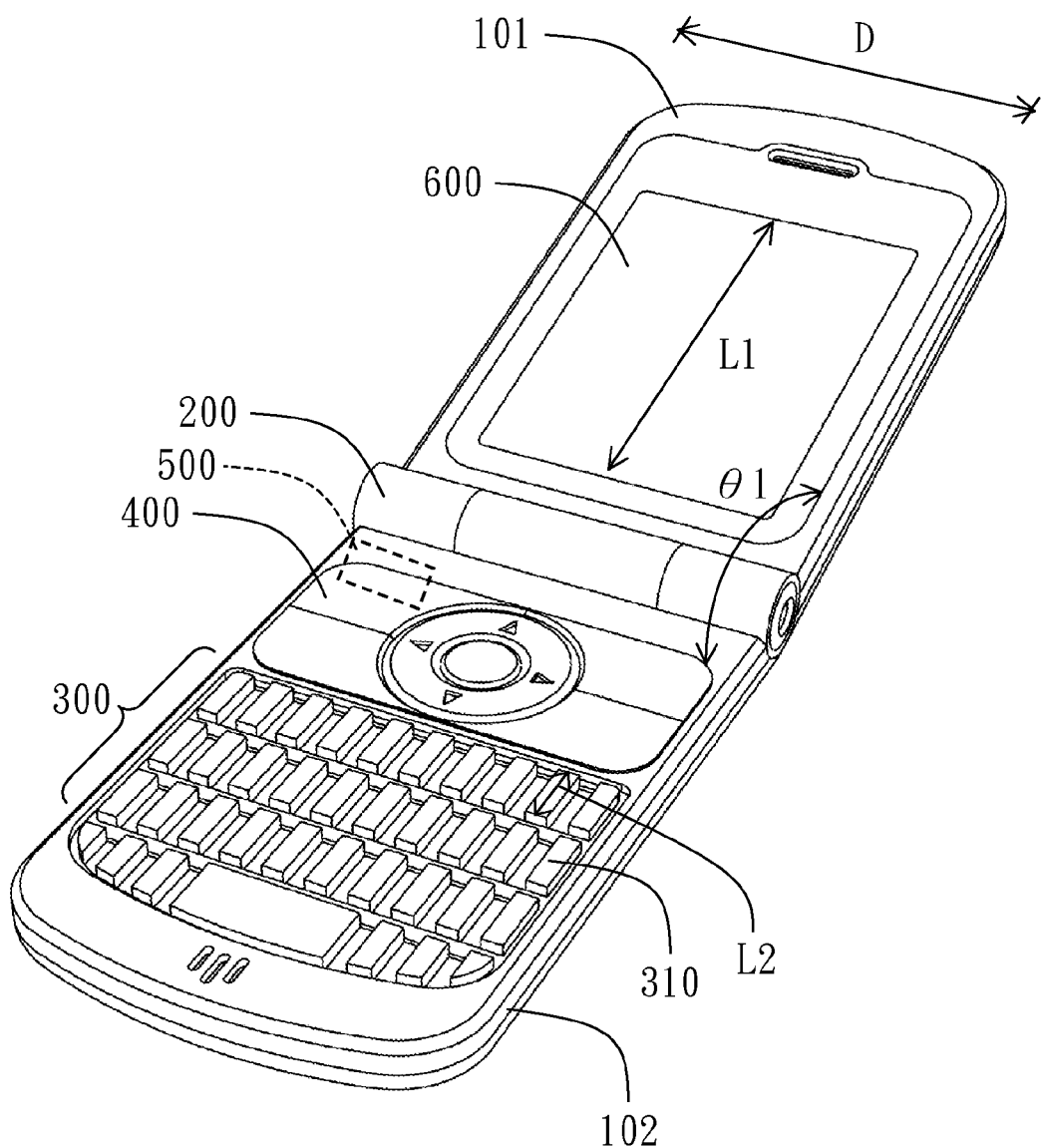
FIG. 2 is a perspective view of a communication device operating in a first operating mode according to an embodiment of the present invention.
Figure 3:
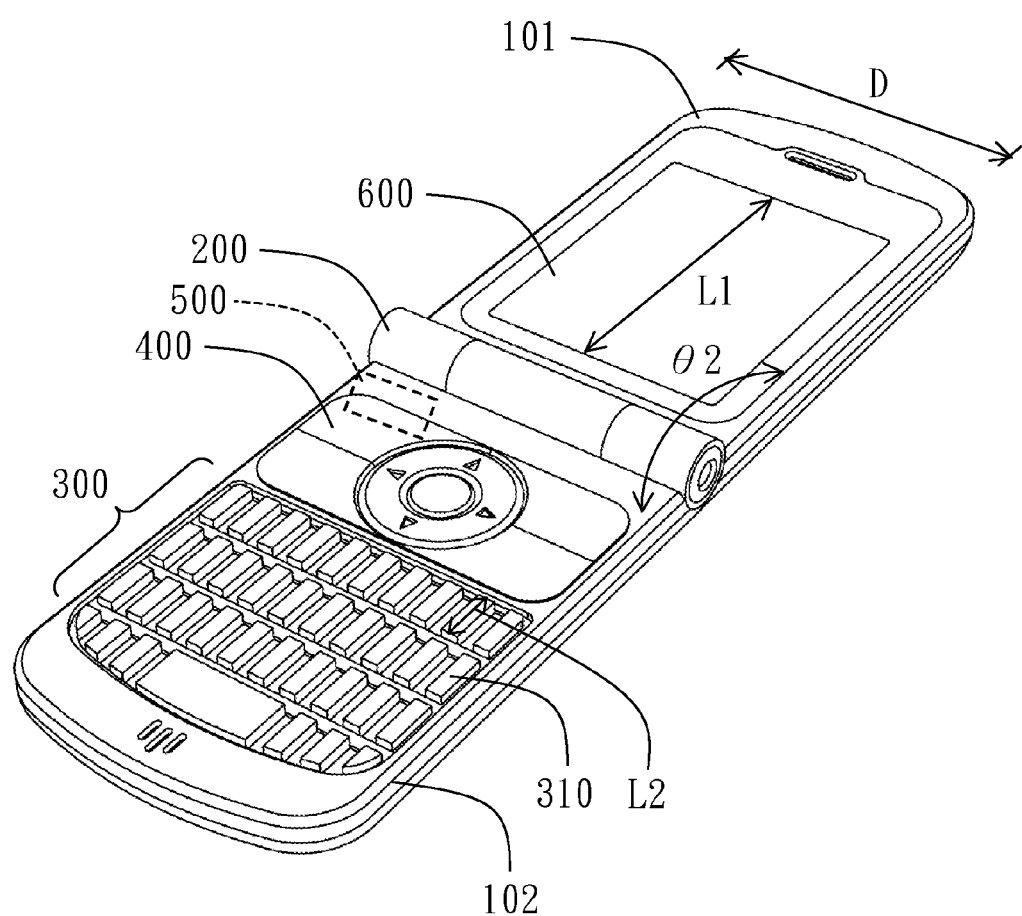
FIG. 3 is a perspective view of the communication device of FIG. 2 operating in a second operating mode.

Referring to FIG. 2 and FIG. 3, FIG. 2 is a perspective view of a communication device operating in a first operating mode according to an embodiment of the present invention and FIG. 3 is a perspective view of the communication device of FIG. 2 operating in a second operating mode. The communication device 100 according to the embodiment of the present invention is a hand-held electronic device. The communication device 100 includes a first casing 101, a second casing 102, a hinge 200, a keyboard 300, an antenna 500, an auxiliary device 400 and a display 600.

The hinge 200 is connected to the first casing 101 and the second casing 102, so that the first casing 101 is capable of rotating with respect to the second casing 102. In the embodiment of the present invention, the hinge 200 is a two-stop hinge for switching the communication device 100 to operate in the first operating mode (as shown in FIG. 2) or the second operating mode (as shown in FIG. 3).

As shown in FIG. 2, when the communication device 100 operates in the first operating mode, the angle formed between the first casing 101 and the second casing 102 is indicated as a first angle $\theta 1$. In the embodiment of the present invention, the first operating mode is a phone mode, and the first angle $\theta 1$ is greater than 90 degrees and less than 180 degrees. A user can make or receive a call by using the communication device 100 in the first operating mode. The first angle $\theta 1$ can be adjusted to facilitate a user to hold the communication device 100 during a telephone communication.

As shown in FIG. 3, when the communication device 100 operates in the second operating mode, the angle formed between the first casing 101 and the second casing 102 is indicated as a second angle $\theta 2$. In the embodiment of the present invention, the second operating mode is a network mode, and the second angle $\theta 2$ is substantially equal to 180 degrees. A user can browse the internet and send, receive or edit an e-mail by using the communication device 100 in the second operating mode. The second angle $\theta 2$ is designed to facilitate users to view the screen of the communication device 100, browse the internet, or send/receive an e-mail.

As shown in FIG. 2 and FIG. 3, the keyboard 300 for inputting data is disposed at the second casing 102. In the embodiment of the present\invention, the keyboard 300 can be, for example, a QWERTY keyboard, an AZERTY keyboard, a QWERTZ keyboard or a DVORAK keyboard. The keyboard 300 has a plurality of long-shaped keys 310, and a long-axis direction L2 of the long-shaped keys 310 is not parallel to the hinge 200. As the first casing 101 is capable of folding onto the second casing 102 with the aid of the hinge 200, the disposition of the long-axis direction L2 of the long-shaped keys 310 is more flexible. That is, the long-axis direction L2 of the long-shaped keys 310 can be perpendicular to the hinge 200, as shown in FIG. 2 and FIG. 3. As a result, the width D of the communication device 100 decreases accordingly.

The antenna 500 for sending or receiving a communication signal is disposed in the second casing 102. The antenna 500 is denoted by dotted lines in FIG. 2 and FIG. 3 since the antenna 500 is disposed inside the second casing 102. Alternatively, the antenna 500 can be disposed inside the first casing 101. The position of the antenna 500 depends on the hardware designs of the communication device. In the embodiment of the present invention, the auxiliary device 400 for inputting commands is disposed at the second casing 102. The auxiliary device 400, such as direction keys for moving a cursor and other function keys, is used for assisting the use of the keyboard 300. The auxiliary device 400 is an optional element in the communication device 100, and it is to be understood that the invention is not limited thereto. The display 600 for displaying images is disposed at the first casing 101. As the aid of the hinge 200 can provide the flexible design in a long-axis direction L1 of the display 600, the long-axis direction L1 of the display 600 is designed to be perpendicular to the hinge 200. As a result, the width D of the communication device 100 can decrease accordingly.

Figure 1:
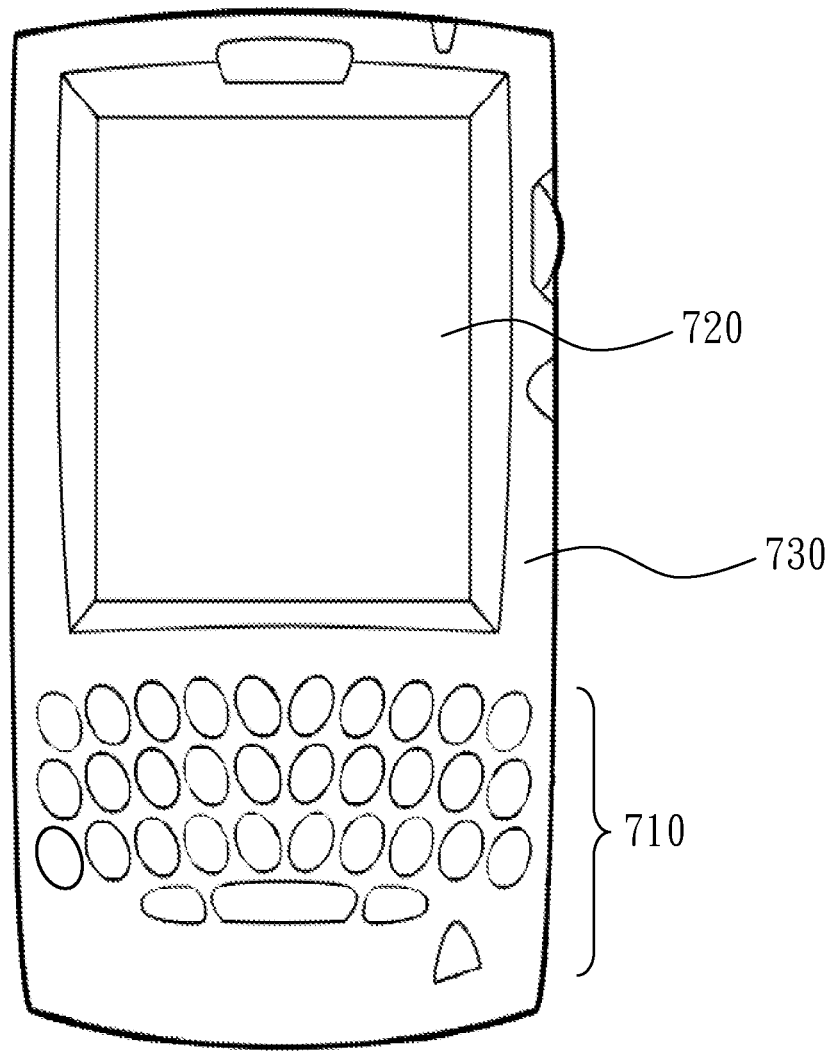
FIG. 1 (Prior Art) is a perspective view of a conventional communication device.

The communication device 100 according to the invention and the traditional communication device 700 have great structural differences. The display 600 and the keyboard 300 of the communication device 100 are disposed at two casings, i.e. at the first casing 101 and the second casing 102, respectively. However, the keyboard 710 and the display 720 of the traditional communication device 700 (shown in FIG. 1) are disposed at one casing 730. The two casings, the first casing 101 and the second casing 102, of the communication device 100 allow themselves to fold onto each other with the aid of the hinge 200. The hinge 200 provides a further function: automatic switching between two operating modes.

In other words, under the condition of equipping a display and a keyboard having the same size as that of the traditional communication device 700, the communication device 100 according to the embodiment of the invention has much smaller carry-size when the two casings 101 and 102 are folded onto each other. In addition, by the design according to the embodiment of the invention, there is more space at the communication device 100 for adding other components, such as the auxiliary device 400.

The communication device of the invention is a foldable hand-held electronic device. While the size of the communication device is highly reduced, the design and arrangement of the casing surface become more flexible. For the folding-size of the communication device is highly reduced, the surface of each casing containing the display or the keyboard could be designed to be broader to allow more free and convenient use. The communication device in folding mode has the advantage of being small and easy to carry and it in the unfolding mode has the advantage of two operating modes, the phone mode and the network mode. In addition, the two-stop hinge of the invention allows the communication device to freely switch between the two operating modes, which is user friendly. Furthermore, the design of long-shaped keys on the keyboard and the shape of the display can further benefit the decreasing of the size of the communication device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A foldable hand-held communication device, comprising:
    a first casing and a second casing;
    a hinge connected to the first casing and the second casing, so that the first casing is capable of rotating a first angle greater than 90 degrees and a second angle greater than the first angle with respect to the second casing for switching the communication device to operate in one of a first operating mode and a second operating mode by one hinge, wherein the first angle corresponds to the first operating mode and the second angle corresponds to the second operating mode;
    a multi-direction key disposed at the second casing for inputting commands;
    a keyboard disposed at a surface plane of the second casing for inputting data, wherein the keyboard is one of a QWERTY keyboard, an AZERTY keyboard, a QWERTZ keyboard and a DVORAK keyboard, the keyboard has a plurality of long-shaped keys perpendicular to the hinge, and has a same width as the first casing; and
    an antenna disposed in the second casing for sending or receiving a communication signal.

2. The foldable hand-held communication device according to claim 1, wherein the hinge is a two-stop hinge for switching the communication device to operate in one of a first operating mode and a second operating mode.

3. The foldable hand-held communication device according to claim 2, wherein the first angle is formed between the first casing and the second casing when the communication device is switched to operate in the first operating mode and the second angle is formed between the first casing and the second casing when the communication device is switched to operate in the second operating mode.

4. The foldable hand-held communication device according to claim 3, wherein the first angle is greater than 90 degrees and less than 180 degrees and the second angle is substantially equal to 180 degrees.

5. The foldable hand-held communication device according to claim 2, wherein the first operating mode is a phone mode of making or receiving a call.

6. The foldable hand-held communication device according to claim 2, wherein the second operating mode is a network mode of sending or receiving a message.

7. The foldable hand-held communication device according to claim 1, further comprising:
    an auxiliary device disposed at the second casing for inputting commands; and
    a display disposed at the first casing for displaying an image.

8. The foldable hand-held communication device according to claim 1, wherein the keyboard has a plurality of long-shaped keys and a long-axis direction of the long-shaped keys is not parallel to the hinge.

9. A communication device, comprising:
a first casing and a second casing;
a two-stop hinge connected to the first casing and the second casing, wherein the first casing is capable of rotating a first angle greater than 90 degrees and a second angle greater than the first angle with respect to the second casing, so that the two-stop hinge is capable of switching the communication device to operate in one of a first operating mode and a second operating mode by one hinge; and
a keyboard disposed at the second casing for inputting data, wherein the keyboard is one of a QWERTY keyboard, an AZERTY keyboard, a QWERTZ keyboard and a DVORAK keyboard, the keyboard has a plurality of long-shaped keys perpendicular to the hinge, and has a same width as the first casing;
wherein the first angle is formed between the first casing and the second casing when the communication device is switched to operate in the first operating mode and the second angle is formed between the first casing and the second casing when the communication device is switched to operate in the second operating mode.

10. The communication device according to claim 9, wherein the first angle is greater than 90 degrees and less than 180 degrees and the second angle is substantially equal to 180 degrees.

11. The communication device according to claim 9, wherein the first operating mode is a phone mode of making or receiving a call.

12. The communication device according to claim 9, wherein the second operating mode is a network mode of sending or receiving a message.

13. The communication device according to claim 9, further comprising:
an auxiliary device for inputting commands disposed at the second casing;
a display disposed at the first casing for displaying an image; and
an antenna disposed in the first casing or the second casing for sending or receiving a communication signal.

14. The communication device according to claim 13, wherein the keyboard has a plurality of long-shaped keys and a long-axis direction of the long-shaped keys is not parallel to the two-stop hinge.

15. A communication device, comprising:
a first casing and a second casing;
a hinge connected to the first casing and the second casing, so that the first casing is capable of rotating a first angle greater than 90 degrees and a second angle greater than the first angle with respect to the second casing for switching the communication device to operate in one of a first operating mode and a second operating mode by one hinge;
a multi-direction key disposed at the second housing for inputting commands;
a keyboard disposed at a surface plane of the second casing for inputting data, wherein the keyboard is one of a QWERTY keyboard, an AZERTY keyboard, a QWERTZ keyboard and a DVORAK keyboard, the keyboard has a plurality of long-shaped keys and a long-axis direction of the long-shaped keys is not parallel to the hinge, the keyboard has a same width as the first casing; and
a display disposed at the first casing for displaying an image.

16. The communication device according to claim 15, wherein a long-axis direction of the display is perpendicular to the hinge.

17. The communication device according to claim 15, wherein the hinge is a two-stop hinge for switching the communication device to operate in one of a first operating mode and a second operating mode.

18. The communication device according to claim 17, wherein the first angle greater than 90 degrees and less than 180 degrees is formed between the first casing and the second casing when the communication device is switched to operate in the first operating mode and the second angle substantially equal to 180 degrees is formed between the first casing and the second casing when the communication device is switched to operate in the second operating mode.

19. The communication device according to claim 17, wherein the first operating mode is a phone mode of making or receiving a call, and the second operating mode is a network mode of sending or receiving a message.

20. The communication device according to claim 15, further comprising:
an auxiliary device disposed at the second casing for inputting commands; and
an antenna disposed in the first casing or the second casing for sending or receiving a communication signal.

* * * * *